United States Patent Office 2,915,513
Patented Dec. 1, 1959

2,915,513

POLYMERIZATION PROCESS

Gerald T. Leatherman and Clyde V. Detter, Bartlesville, Okla., assignors to Phillips Petroleum Company, a corporation of Delaware No Drawing. Application May 21, 1954
Serial No. 431,590

12 Claims. (Cl. 260—94.9)

This invention relates to the preparation of normally solid polymers of olefins. In one aspect it relates to an improved method for conducting a catalytic polymerization process. In another aspect, it relates to a method for decreasing frequency of shutdown of a catalytic reactor.

The copending application of J. P. Hogan and R. L. Banks, Serial No. 333,576, filed January 27, 1953, discloses a method for the production of normally solid polymers which method comprises contacting a 1-olefin with a composite polymerization catalyst comprising chromium oxide, the contacting being conducted at only moderately elevated temperatures and pressures. The products of that process range from tacky to brittle solid polymers which are useful in the plastic field since they can be molded, extruded to form pipes, tubing or insulation or can be used as constituents of protective coating compositions. The feed material ordinarily used in such a process is a 1-olefin having a maximum carbon chain length of 8 carbon atoms and no chain branching nearer the double bond than the 4-position. The olefin is preferably supplied to the reactor in solution in a suitable solvent such as pentane, heptane, octane, decane or dodecane. The catalyst is usually prepared by impregnating a suitable material, preferably a particulate metal oxide, with a solution of a chromium compound which is readily convertible to chromium oxide by calcination. The impregnation is followed by drying and heating the resulting composite at an elevated temperature in the presence of a conditioning gas. Although the chemical state of the chromium compound which ultimately results is not thoroughly understood, it is believed that a substantial amount of hexavalent chromium is highly desirable.

In most catalytic processes, particularly those in which a fixed bed of catalyst is used, there comes a time during the conversion period at which it becomes necessary to interrupt the reaction and recondition the catalyst by removal of materials which are deposited on the catalyst surface. In the process described above, it ultimately becomes necessary to interrupt the polymerization in order to remove heavy polymer or other carbonaceous material which is deposited upon the surface of the catalyst. It has been found that where a highly active catalyst, e.g., a catalyst containing a relatively high chromium oxide content, is utilized, polymer is deposited on the catalyst in the upstream portion of the reactor, i.e., that portion adjacent the point of entry of the olefin feed. Where the catalyst is highly active, the inlet portion of the catalyst bed appears to be the point of maximum polymer formation. This is the point at which the fresh feed first contacts the catalyst and at which the olefin concentration in the feed is higher than at downstream points in the catalyst bed. The formation of polymer at this point ultimately causes stoppage of flow through the catalyst bed and may ultimately result in an undesirable extent of disintegration of the individual catalyst particles unless the flow of feed is interrupted and the polymer is removed from the catalyst surface. It is clearly desirable to make the frequency of shutdown for reconditioning of the catalyst as low as possible.

This invention provides a process whereby the frequency of shutdown for catalyst reconditioning is minimized and the on-stream period of a given catalytic reactor is appreciably increased.

According to this invention, there is provided, in a process in which at least one olefin is converted to a normally solid polymer by contacting said olefin with a polymerization catalyst comprising chromium oxide, the improvement which comprises contacting said olefin with a catalyst mass in which the chromium oxide content increases in the direction of olefin flow. When the operation is conducted in this manner, the highest concentration of olefin, i.e., that in the feed which enters the reactor, contacts a composite catalyst having minimum chromium oxide content, and the feed stream which proceeds through the catalyst bed and which contains constantly decreasing concentrations of reactant olefin, contacts catalyst of higher chromium oxide content. Thus, the formation of heavy polymer at the inlet end of the catalytic reactor is decreased and the deposition of polymer on the catalyst is more uniformly distributed throughout the length of the catalyst bed. This results in a decreased frequency of stoppage and enables the process to be operated with longer on-stream or conversion periods.

According to this invention, it is preferred that the catalyst which is present in the upstream portion of the bed contain chromium oxide in a concentration in the range from 0.1 to 1.5 weight percent and that the catalyst in the remainder of the bed have a concentration of chromium oxide above 1.5 weight percent. As disclosed in the aforementioned application of Hogan and Banks, there appears to be no fixed upper limit to the amount of chromium oxide that can be used in the catalyst. Thus, it appears that amounts as high as 50 weight percent of the catalyst can be utilized to obtain satisfactory results. However, as a practical matter, it is preferred that the catalyst in the downstream end of the catalyst bed be in the range 2 to 10 weight percent. According to a preferred embodiment of the invention, the chromium oxide content within the upstream third of the reactor is in the range 0.1 to 1.5 percent and the chromium oxide content of the catalyst in the downstream two-thirds of the catalyst bed is in the range of 2 to 10 weight percent.

It will be evident to those skilled in the art that the upstream third of the catalyst can be uniform as regards chromium oxide content within the range disclosed hereinbefore and that the chromium oxide content of the catalyst in the downstream two-thirds can also be uniform within the corresponding disclosed range. Alternatively, several layers (e.g. three or more) of the catalyst can be positioned so that the chromium oxide content increases in the direction of flow. Furthermore, a catalyst bed can be utilized in which the chromium oxide content increases gradually from the inlet to the outlet end of the reactor, the ranges disclosed hereinbefore being observed. Alternatively, two separate reactors connected in series and containing catalysts of different chromium oxide content can be used.

As disclosed in the cited application of Hogan and Banks, examples of olefins which can be used as feed are ethylene, propylene, 1-butene, butadiene, and 1-pentene. Copolymers of these or other olefins can be prepared, for example, by utilizing a feed comprising a mixture of ethylene and propylene.

The solvent which is used in the process of this invention is preferably a normally liquid hydrocarbon which is inert or non-reactive under the conditions of operation.

Isooctane has been found to be a very satisfactory solvent. Other solvents are n-pentane, n-hexane, n-heptane and n-decane.

The process of this invention is conducted, generally, at a reaction temperature in the range 150 to 450° F. A preferred range is 275 to 375° F. when ethylene is polymerized and 150 to 250° F. when propylene or a higher olefin is polymerized.

The reaction pressure is a sufficient pressure to maintain the solvent substantially in the liquid phase. This pressure is usually at least 100 to 300 p.s.i. and preferably about 500 p.s.i. and can be as high as 700 p.s.i. or higher. However, gas-phase reaction can be practiced, and the pressure can be as low as atmospheric.

The space velocity can be from 0.1 to 20 liquid volumes per volume of catalyst per hour, preferably from 1 to 6.

Another advantage of the process of this invention is that relatively high olefin concentrations can be used in the feed to the process. Those olefin concentrations in the range 4 to 10 weight percent based on the feed, can be satisfactorily utilized and concentrations as high as 15 percent can be utilized if desired. Of course, concentrations below 4 percent can be utilized with satisfaction. The chief advantage of utilizing high ethylene concentrations in the feed is that the productivity of the process is increased.

*Example*

The following tabulation shows the effect of chromium oxide content of the catalyst and of ethylene content of the feed on polymer deposition on the catalyst.

| Run No. | 1 | 2 | 3 | 4 | 5 | 6 |
| --- | --- | --- | --- | --- | --- | --- |
| Reaction pressure, p.s.i. | 600 | 600 | 600 | 600 | 600 | 600 |
| Reaction temperature, ° F. | 255 | 256 | 322 | 311 | 300 | 260-310 |
| Chromium Oxide Content of Catalyst, Wt. Percent | 1.2 | 2.7 | 2.6 | 0.66 | 2.5 | 0.5 |
| Wt. Percent of Ethylene in Feed | 2.4 | 2.0 | 2.0 | 2.8 | 4.22 | 11.6 |
| Conversion, Wt. Percent | 95 | 98 | 98 | 95 | 98.7 | 52 |
| Yield (Wt. Percent of Olefin Converted) | 69 | 44 | 90.3 | 86 | 75.2 | 69 |
| Polymer Deposit on Catalyst (Wt. Percent of Catalyst) | 10 | 21 | 9.1 | 8.6 | 13.3 | 15.0 |
| Molecular Weight | 21,220 | 23,720 | 15,750 | 10,540 | 23,130 | 18,290 |
| LHSV | 4.4 | 4.4 | 6 | 5.0 | 4.3 | 4.3 |
| Time on Stream, Hr. | 4 | 4 | 5 | 5.2 | 4 | 1.75 |

The foregoing data show that a catalyst containing 2.7 weight percent chromium oxide (run 2) produced a polymer deposit on the catalyst amounting to 21 weight percent of the catalyst, whereas, a catalyst containing 1.2 weight percent chromium oxide (run 1) produced only 10 weight percent of polymer on the catalyst surface. A comparison of runs 5 and 6 with runs 3 and 4 shows that increased ethylene content in the feed produces increased amounts of polymer deposition on the catalyst.

In connection with the above data, it should be noted that higher temperatures produce lower molecular weight polymers and a somewhat lower deposition of polymer on the catalyst surface, all other factors being constant.

When operating according to this invention, utilizing a reactor in which the chromium oxide content of the catalyst is 1.0 weight percent in the upstream one-third of the catalyst bed and the chromium oxide content in the downstream two-thirds is 3 weight percent, the olefin feed is passed, first through the 1.0 percent chromium oxide section of the reactor and then through the 3 percent section. The polymer deposited on the catalyst is uniformly distributed throughout the length of the catalyst bed and the amount of the polymer deposited in the upstream portion is substantially lower than the figures shown in the foregoing tabulation for the same on-stream times. In such an operation, the catalyst is chromium oxide deposited on a coprecipitated mixture of silica (90 percent) and alumina (10 percent), the reactant olefin is ethylene, the solvent is isooctane (2,2,4-trimethylpentane), the temperature of polymerization is approximately 320° F., the pressure is 600 p.s.i., and the weight percent of the ethylene in the feed is approximately 4. A polymer having a molecular weight of 14,000 is produced. The ethylene conversion is about 97 percent per pass.

Although certain structures, process steps and examples have been disclosed for purposes of illustration, the invention is clearly not limited thereto. The essence of this invention is that, in a process in which an olefin is converted to a normally solid polymer in the presence of a chromium oxide catalyst, there is provided the improvement comprising contacting the olefin feed with a chromium oxide catalyst of which the chromium oxide content increases in the direction of flow. The catalyst components, other than chromium oxide, can be considered as carriers or supports, but these terms are not to be construed as limited to catalytically inert materials. One or more of them can contribute to the activity of the catalyst. Presently preferred supports are silica, alumina, and silica-alumina mixtures, preferably having appreciable porosity.

The molecular weights referred to herein were determined by the methods of Kemp and Peters, Ind. Eng. Chem. 35, 1108 (1943), and Dienes and Klemm, J. App. Phys. 17, 458–471 (June 1946). The molecular weights were calculated according to the equation $$M = \frac{4.03 \times 10^3 \times N_i \times 14}{2.303}$$

wherein $M$ is the molecular weight and $N_i$ is the intrinsic viscosity as determined for a solution of 0.2 gm. of polymer in 50 cc. of tetralin at 130° C.

Throughout this specification and the appended claims, chromium oxide contents are sxpressed as percentages of elemental chromium.

We claim:

1. In a process wherein an olefin is polymerized in a polymerization reactor by contacting same with a fixed bed of chromium oxide catalyst under conditions where polymer is deposited on the catalyst in the upstream portion of the reactor and thereby tending to plug said reactor at this position, the improvement comprising contacting, in a reaction zone under polymerization conditions, at least one 1-olefin having a maximum chain length of 8 carbon atoms and no chain branching nearer the double bond than the 4-position, in solution in an inert normally liquid hydrocarbon solvent, with a composite chromium oxide polymerization catalyst, the proportion of chromium oxide in said catalyst being in the range 0.1 to 1.5 weight percent in an upstream portion of said zone and greater than 1.5 weight percent in the remainder of said zone, at a temperature in the range 150 to 450° F. and a pressure in the range 100 to 700 p.s.i. whereby tendency to plugging is reduced, and recovering a normally solid polymer of said olefin.

2. A process according to claim 1 wherein said solvent is isooctane, the chromium oxide content of the catalyst in the upstream third of said zone is in the range 0.1 to 1.5 weight percent, and the chromium oxide content of the catalyst in the downstream two-thirds of said zone is in the range 2 to 10 weight percent.

3. A process according to claim 2 wherein a mixture of ethylene and propylene is contacted with said catalyst and a normally solid copolymer of ethylene and propylene is recovered.

4. A process according to claim 2 wherein said olefin is propylene.

5. A process according to claim 2 wherein said olefin is 1-butene.

6. A process according to claim 2 in which said olefin is 1-pentene.

7. A process according to claim 2 wherein said olefin is ethylene.

8. A process according to claim 2 wherein said olefin is ethylene and the concentration thereof in the feed is in the range 4 to 15 weight percent.

9. A process according to claim 2 wherein said olefin is ethylene and the concentration thereof in the feed is in the range 4 to 10 weight percent.

10. A process according to claim 2 wherein said olefin is contacted in the gaseous phase.

11. In a process in which a feed stream comprising ethylene in admixture with a normally liquid inert hydrocarbon is polymerized, at a temperature in the range 150 to 450° F., a pressure sufficient to maintain said feed stream substantially in the liquid phase, and a liquid hourly space velocity in the range 0.1 to 20 by passing same through a fixed bed of a solid composite chromium oxide polymerization catalyst, whereby a normally solid polymer of ethylene is formed and part of said polymer deposits on said catalyst, the improvement which comprises passing said feed through a fixed bed of said catalyst wherein the chromium oxide content of said catalyst is in the range 0.7 to 1.5 weight percent in the upstream one-third of said bed and the chromium oxide content of said catalyst is in the range 2 to 10 weight percent in the downstream two-thirds of said bed.

12. In a process in which an olefin is converted to normally solid polymer by passing, under polymerization temperature and pressure conditions, through a fixed bed of a solid composite chromium oxide containing polymerization catalyst, the improvement comprising passing said olefin through a fixed bed of said catalyst wherein the chromium oxide content of said catalyst in the upstream one-third of said bed is in the range 0.1 to 1.5 weight percent and the chromium oxide content of said catalyst in the downstream two-thirds of said bed is greater than 1.5 weight percent.

References Cited in the file of this patent

UNITED STATES PATENTS

| | | |
|---|---|---|
| 2,283,499 | Hachmuth | May 19, 1942 |
| 2,368,110 | Buell | Jan. 30, 1945 |
| 2,404,788 | Burk | July 30, 1946 |
| 2,429,161 | Hudson | Oct. 14, 1947 |
| 2,590,539 | Hudson | Mar. 25, 1952 |
| 2,691,647 | Field | Oct. 12, 1954 |
| 2,692,259 | Peters | Oct. 19, 1954 |